United States Patent Office 3,422,621
Patented Jan. 21, 1969

3,422,621
BOOSTER FOR USE IN HYDRAULIC SYSTEMS, PARTICULARLY HYDRAULIC BRAKING SYSTEMS
Alfred Yardley, Tyseley, Birmingham, England, assignor to Girling Limited
Filed Apr. 18, 1966, Ser. No. 543,170
Claims priority, application Great Britain, Apr. 27, 1965, 17,647/65
U.S. Cl. 60—54.5        8 Claims
Int. Cl. F15b 7/08

ABSTRACT OF THE DISCLOSURE

The invention relates to booster arrangements for booster assisted hydraulic actuators, and is concerned with eliminating the phenomenon known as "hydraulic knock."

It has been found that this can be achieved by separating in time the point at which the auxiliary piston is engaged by the booster push-rod and the usual fluid supply path through the piston is closed. In some cases, the piston is initially engaged by the rod and moves as one with it upon actuation of the booster, and the fluid supply path across the piston is interrupted after a predetermined initial displacement of the piston and rod. The path may include a side port in the piston closable by a ball valve or by a seal carried by the piston. In other cases, the path is closed prior to the push rod engaging the piston.

---

This invention relates to booster arrangements for booster-assisted hydraulic systems, such as vehicle brake systems, in which a booster piston has a piston rod arranged, upon actuation of the booster, to close a path for the supply of fluid to an auxiliary cylinder and to displace an auxiliary piston in the said cylinder to increase fluid presure in the cylinder.

Such an arrangement is described in British Patent No. 786,524, which discloses an arrangement in which the booster piston rod is normally spaced from the auxiliary piston, which is formed with a passage forming part of the fluid supply path. Upon actuation, the piston rod moves forward into engagement with the auxiliary piston, so as to close the passage and initiate displacement of the piston instantaneously; movement of the piston with the passage closed increases the fluid pressure in the auxiliary cylinder to pressurise the system under control. Known arrangements of this type tend to exhibit the undesirable phenomenon known as "hydraulic knock," and the main object of the present invention is to reduce or eliminate this tendency.

In accordance with the invention, the initial movement of the auxiliary piston is arranged to take place before or after closure of the said fluid supply path, rather than simultaneously as it did in the known arrangements referred to above.

In some embodiments of the invention, the booster piston rod and auxiliary piston are arranged to move as one upon actuation of the booster, and a passage for the supply of ffuid to the auxiliary cylinder is closed automatically upon a predetermined initial displacement of the rod. This arrangement ensures that there is no mechanical impact between the rod and the auxiliary piston, and as the initial speed of the booster piston is rather slow, due to the inertia of the booster, the initial build-up of pressure takes place smoothly.

In other embodiments of the invention, the arrangement is such that, upon actuation of the booster, initial movement of the auxiliary piston by the rod takes place after initial movement of the rod and after closure of the supply port, and a resilient spacer is disposed between the rod and auxiliary piston to form a buffer, thereby reducing the mechanical impact between the rod and piston.

In each case it is possible to obtain a gradual build-up of pressure in the auxiliary cylinder and to reduce the sudden surges of pressure which appear to cause "hydraulic knock."

Some forms of booster arrangements in accordance with the invention will now be described, by way of example only, with reference to the accompanying drawings, in which.

In the drawings, corresponding parts of different embodiments are given like reference numerals.

Figure 1:
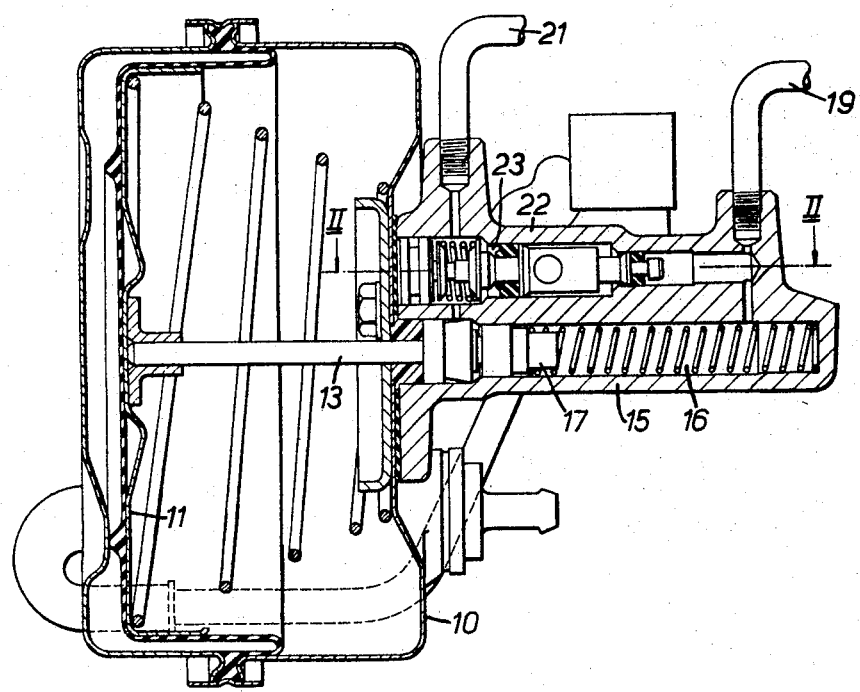
FIGURE 1 is an axial section of one form of booster arrangement.
Figure 2:
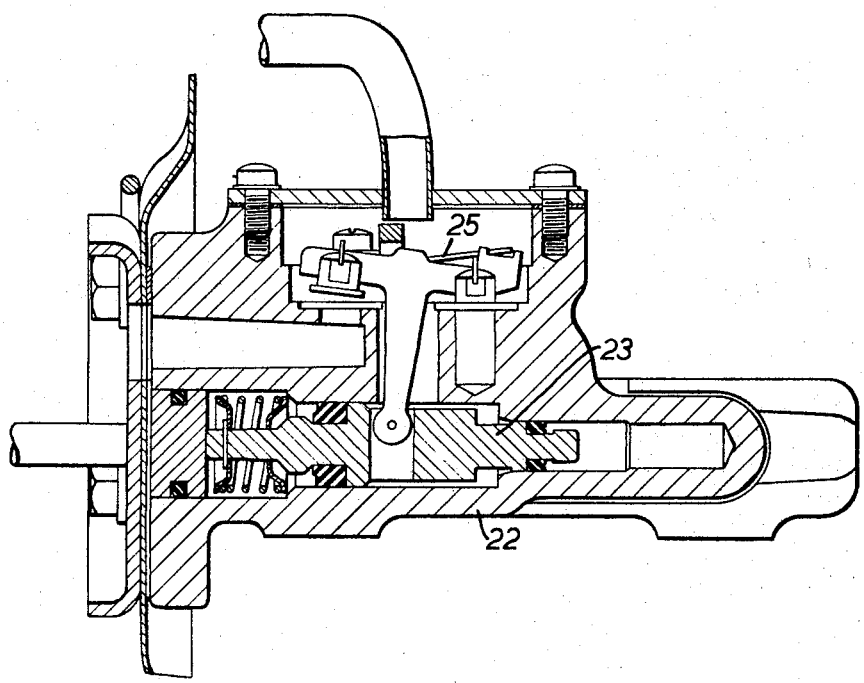
FIGURE 2 is a section on the line II—II of FIGURE 1, showing part of the arrangement.

The booster arrangement shown in FIGURES 1 and 2 comprises a booster chamber 10 with a piston 11 and piston rod 13 arranged to cooperate with a piston 17 in an auxiliary cylinder body 15 connected in parallel with a control cylinder 22 having a piston 23 for actuating valve mechanism 25 which controls operation of the booster. The cylinders 15 and 22 are connected to lines 19 and 21 leading to brake slave cylinders and a master cylinder respectively. Upon actuation of the master cylinder, fluid flows through the piston 17 and to the cylinder 22 to displace the piston 23 and actuate the valve mechanism, causing the booster to operate in known manner by introducing a pressure difference across the piston 11. After initial displacement of the piston rod 13, the passage through the piston 17 is closed, whereupon further movement of the rod and piston 17 will cause a further increase in fluid pressure in the auxiliary cylinder. The control piston 23 is subjected in one sense to the pressure in the master cylinder and in the opposite sense to the pressure in the brake system and returns the valve mechanism to its original (illustrated) condition when the manual effort applied is counterbalanced by the system pressure.

Figure 3:
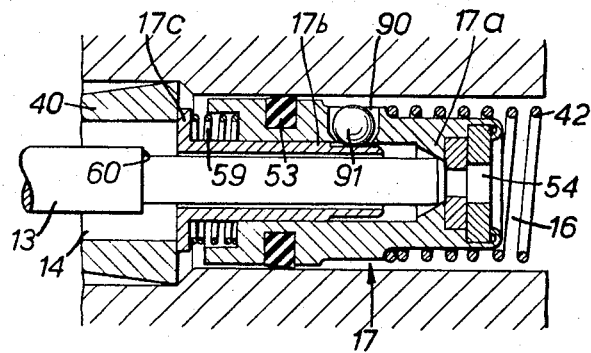
FIGURE 3 is an axial section showing part of the mechanism on a larger scale.

As so far described, the arrangement is the same as that described in British Patent Number 786,524, but in accordance with the present invention, the construction and arrangement of the auxiliary piston and its relationship with the piston rod 13 are as best illustrated in FIGURE 3.

The piston 17, which is disposed between a cylinder space 14 and the cylinder chamber 16 of the auxiliary cylinder body 15, comprises a forward part 17A carrying a seal 53, and a rear part 17B. At the forward end of the part 17A there is a passage 54, which is normally closed by the forward end of the rod 13, against which the piston part 17A is urged by a return spring 42. The rear piston part 17B is in the form of a hollow cylindrical body, having at its rear end an outwardly projecting flange 17C, which is normally held against a nylon bush, or back stop 40 by a light coil spring 59. The cylindrical body 17B surrounds the rod 13 with a slight clearance so that fluid can pass from the space 14 to the interior of the piston part 17A.

The piston part 17A is formed in its side wall with a leakage port or passage 90 with which a ball valve 91 co-operates. In the inoperative position, the ball valve 91 is held off its seating in the passage 90 by the cylindrical piston body 17B, so that an open fluid supply path is provided past the piston 17, and thus between the master cylinder and the slave cylinder.

When the booster is energised, the rod 13 moves forwardly, and the piston part 17A moves as one with the rod, but the rear piston part 17B is held against the stop bush 40 by the expansion of the spring 59. As the piston parts 17A and 17B separate axially, the ball valve 91 is allowed to close, thus isolating the cylinder 16 from the space 14, whereupon the force exerted on the piston part 17A by the rod 13 serves to intensify the pressure in the cylinder 16 and the slave cylinders. The axial separation of the piston parts 17A and 17B is limited by a shoulder 60 and the rod 13.

It will be seen that braking pressure is built up in two stages: a first stage in which the master cylinder pressure is transmitted directly to the auxiliary cylinder 16 and slave cylinders through the open passage 90, and a second stage following closure of the passage 90. In the unoperated condition, the open passage 90 acts as a recuperation passage to accommodate changes due, for example, to temperature changes, to allow for return flow of fluid after operation of the booster.

It is noted that the passage 54 remains closed throughout normal operation of the booster and is only opened by separation of the rod 13 and piston part 17A during bleeding of the hydraulic circuit or abnormally heavy or fast brake application.

This construction is found to be very satisfactory from the point of view of eliminating hydraulic knock and it is easier and cheaper to manufacture and assemble than previously known arrangements.

Figure 4:
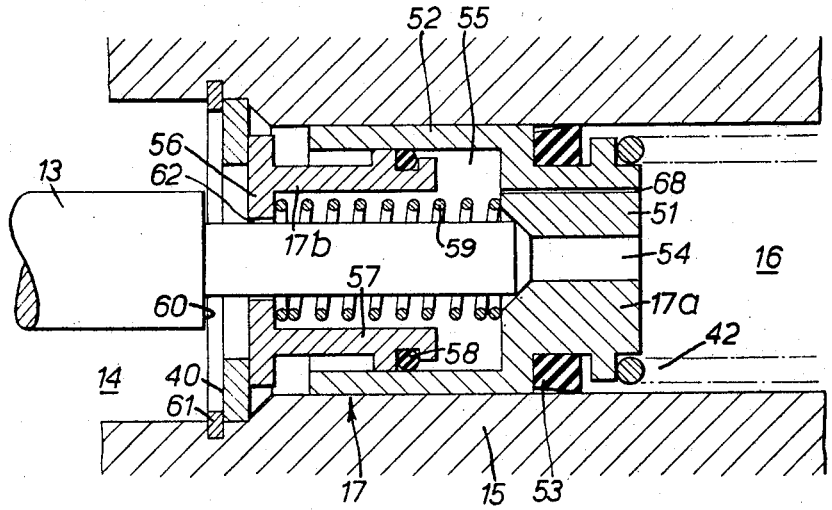
FIGURES 4 and 5 are views, similar to FIGURE 3, showing a form of the invention with parts in different operative positions.

The embodiment illustrated in FIGURE 4 is another in which the piston moves as one with the rod through normal operation of the booster. The piston assembly 17 again comprises a forward member 17a of generally sleeve-like form with a flat annular front face 51 bearing a backwardly extending skirt 52, and is sealed by a sealing ring 53. A central port or passage 54 outwardly tapering at its back end is provided through the end plate 51, the bevelled free end of the piston rod 13 extending to engage normally in this tapered part of the bore 54, closing it off. A recuperation passage 68 is provided through the end face 51, but this recuperation passage could alternatively be provided as a channel in the bevel edge of the piston 13 when it engages in the port 54.

The annular piston member 17a could alternatively be formed integrally with the actuator rod 13. However, the arrangement shown in FIGURE 4 (like that of FIGURE 3) permits the member 17a to lift off the end of the actuator rod on abnormally hard and sharp operation of the brake pedal, or while the system is initially being filled with hydraulic fluid, to permit rapid flow of fluid through the bore 54.

The member 17b of the piston assembly 18 is generally cylindrical and is slidably disposed coaxially in the skirt 52 of the member 17a, forming a chamber 55. The member 17b has a flat annular back face 56 bearing a forwardly extending sleeve 57, the sleeve carrying a sealing ring 58 which forms a sliding seal between the sleeve and the skirt 52. A light spring 59 urges the members 17a and 17b apart. In the off position, the back face 56 of the member 17b is held off a shoulder 60 on the piston rod 13 by the back stop 40, which is a ring retained by a circlip 61 in the housing 15, so that liquid can flow through the annular gap 62 between the inner edge of the face 56 and the rod 13, this gap 62 thus forming a second passage in series with the passage 68.

When the brake pedal is depressed some fluid passes from the chamber 14 through the chamber 55 and the passage 68 to the chamber 16 to provide a first stage of pressure build-up at the brakes. When the control valve admits air to the booster piston, the piston 17A and the rod 13 begin to move forward slowly (because of the arrangement's inertia) the member 17b remaining against the back stop 40 under the action of spring 59. Upon further displacement of rod 13, the shoulder 60 on the piston rod engages the back face of the member 17b, sealing off the mouth of the gap 62, and preventing any further flow of fluid between the chambers 14 and 16 through the recuperation passage 68. This arrangement again avoids hydraulic knock on energisation of the actuator, due to a sudden closure in faucet fashion of a relatively unrestricted communication between the chambers 14 and 16 if the rod is normally off the annular piston and moves into contact with the piston upon displacement of the booster piston as in known arrangements.

Figure 5:
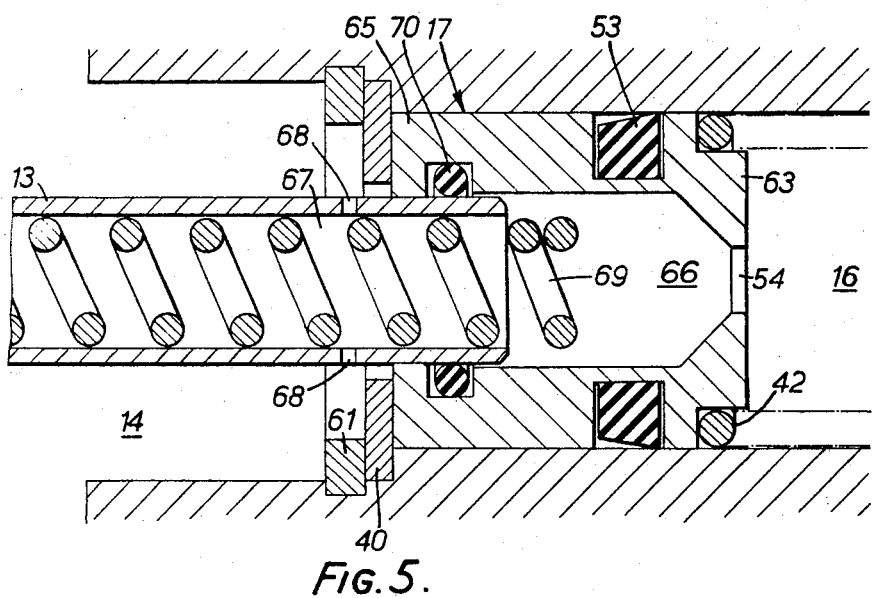
Figure 6:
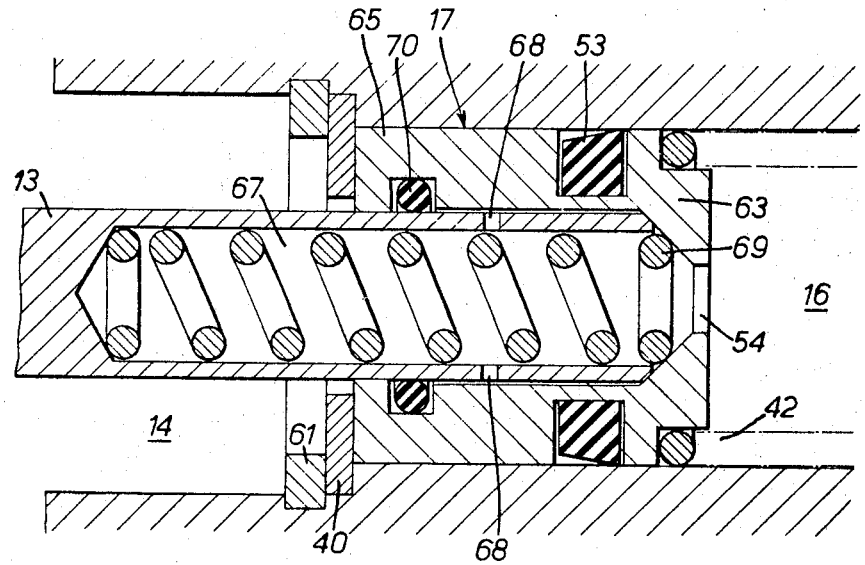
FIGURE 6 is a view, similar to FIGURE 3, of another form of the invention.

FIGURES 5 and 6, show a further embodiment of the invention, FIGURE 5 showing the parts in the unoperated condition and FIGURE 6 showing the actuator rod advanced from the rest position. The piston assembly 17 comprises a unitary generally sleeve-like, member having a flat front face 63 bearing a tubular skirt portion 65 extending backwardly and forming an internal cavity 66. The axial bore 54 through the front plate 63 normally connects the cavity 66 with the chamber 16.

The piston rod 13 has an axial cylindrical cavity 67 formed in its free end, and a side orifice 68 forming a side wall port for the cavity 67. A spring 69 is located in the cavity 67, extending out of its open end. The free end of the piston rod 13 extends, with limited clearance from the skirt 65, into the cavity 66, a sliding seal being provided between the back end of the skirt 65 and the external surface of the rod 13 by a sealing ring 70 located in an annular groove in the wall of the chamber 66.

In the off position of the apparatus, shown in FIGURE 5, the piston assembly 17 is urged against the back-stop 40 by the return spring 42, the side port 68 in the piston 13 clearing the skirt 65 of the piston and connecting the cavity 67 to the chamber 14. When the brake pedal is depressed initially, liquid flows from the chamber 14 through the side port 68, the cavity 66 and the passage 54 to the chamber 16 to provide a first stage in the build-up of system pressure. As the booster is energised, the piston rod 13 moves forward, and the flow of liquid through the side port 68 is staunched as the port enters the skirt 65 of the piston member, being completely cut off automatically when the port has passed the sealing ring 70. Liquid continues to be displaced from the cavity 66 into the chamber 16 as the rod 13 advances to provide a second stage of pressure build-up. After the port 68 is closed by the sealing ring 70 the piston member 17 begins to move forward as the spring 69 is compressed against it, the rod 13 itself ultimately contacting the front face 63 (see FIGURE 6), to apply the booster force to the liquid in the auxiliary cylinder in a third stage of pressure build-up. The build-up of pressure in the chamber 16 occurs smoothly and without knocking since the flow of liquid from the master cylinder to the brake slave cylinders is cut off smoothly at a different time from the start of the auxiliary piston movement, and since the sudden impulse given to the piston member by the rod 13 is cushioned by the spring 69, which also reduces mechanical impact of the parts.

Figure 7:
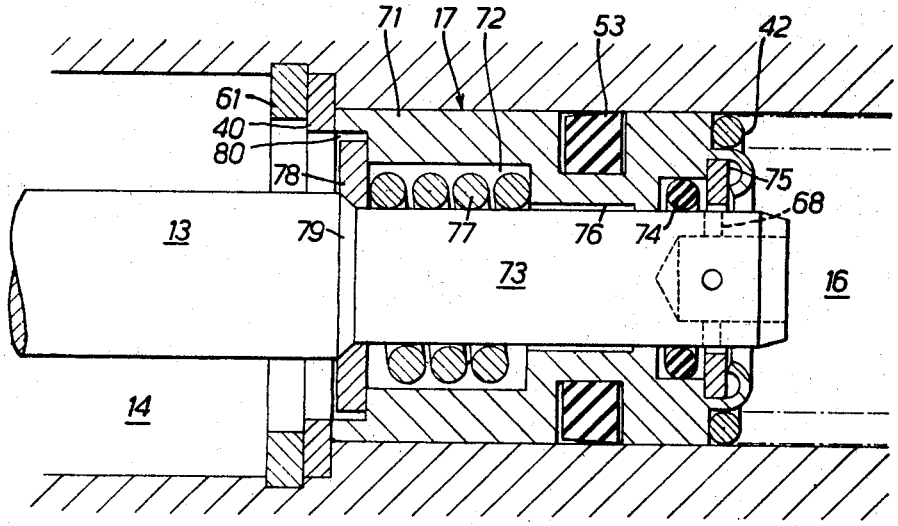
FIGURE 7 is a longitudinal cross-sectional view similar to FIG. 3 of another embodiment of the invention.

In the embodiment of FIG. 7, the piston aossembly 17 comprises a generally sleeve-like piston member 71, recessed internally at 72, and provided with an external annular groove in which the sliding seal 53 fits. The piston member 71 has an axial bore extending right through it to receive a reduced diameter end portion 73 of the actuator rod 13. An "O" ring 74 is located in an internal groove in the forward end face of the piston member 71 by a retaining washer 75, the "O" ring forming a sliding seal between the piston member 71 and the portion 73 of the shaft 13. The return spring 42 butts up against the forward end face of the member 71, as before. Again, as before, the free end of the actuator rod 13 has an internal cavity 67 with side ports 68.

To the rear of the O ring 74, an annular groove 76 is provided, extending axially of the piston member 71 to communicate with the recess 72. The recess 72 houses a buffer spring 77, which, in operation of the booster, bears up against a thrust washer 78 on the shoulder 79 of the actuator rod 13.

In the rest condition of the booster, the piston member 71 is urged by the return spring 42 against its back stop 40. The actuator rod 13 is withdrawn sufficiently for the side ports 68 to be in register with the annular groove 76, and hydraulic fluid can pass from the chamber 14 around the thrust washer 78, through the recess 72, a groove 76 and the port 68 to the chamber 16. When the actuator is energised, the actuator rod 13 moves forward, flow of fluid through the ports 68 being first staunched as they leave the groove 76 and then cut off as they pass the "O" ring 74. The buffer spring 77 then engages the forward end of the recess 72, urging the piston member 71 forward resiliently, until the thrust washer 78 engages in a seat 80 in the rear face of the piston member 71 moving it forward solidly.

Figure 8:
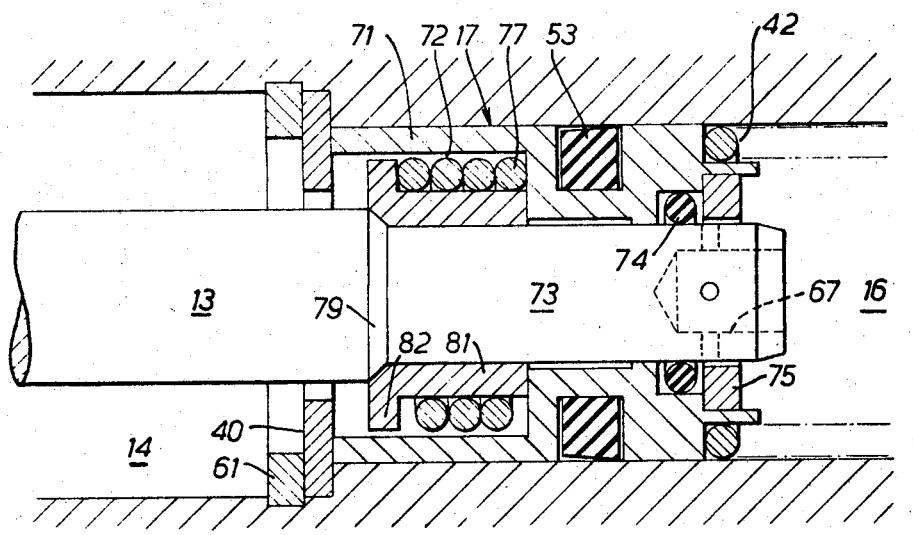
FIGURE 8 is a longitudinal cross-sectional view, similar to FIG. 3 of yet another embodiment of the invention.

Referring now to FIG. 8, in this embodiment the thrust washer 78 is replaced by a sleeve 81. The rear end of the sleeve 81 bears up against the shoulder 79 on the actuator rod 13 and is formed with an external flange 82 for taking the thrust of the buffer springs 77 which is located on the sleeve 81.

When the booster is energised, the shoulder 79 moves the sleeve 81 forward, picking up the piston member 71 through the intermediary of the spring 77. The forward end of the sleeve 81 then butts onto adjacent portion of the piston 71, moving the piston forward solidly.

I claim:

1. A booster arrangement for a booster assisted hydraulic system, including a booster housing, a separator wall adapted to be subjected to differential pneumatic actuating pressures and movable thereby within said housing, an axial rod fastened to said separator wall, an auxiliary hydraulic cylinder, a fixed end wall for said cylinder having a sealed opening through which said rod projects into said auxiliary hydraulic cylinder, an auxiliary piston in said cylinder, means defining a normally open fluid supply path connecting opposed end portions of said cylinder on either side of said piston, said rod being movable by said separator wall through first and second axially spaced positions, said rod abutting said piston in one of said positions, and valve means responsive to movement of said rod into the other of said positions to close said normally open fluid supply path.

2. A booster arrangement as claimed in claim 1, wherein said axial rod is normally spaced from said auxiliary piston, and is adapted to close said fluid supply path prior to engaging said auxiliary piston, said arrangement further including resilient spacer means disposed between said piston rod and said auxiliary piston and adapted to reduce the shock of engagement therebetween.

3. A booster arrangement as claimed in claim 1, including means defining a port in a side of said piston rod, and a sealing member carried by said auxiliary piston, said rod having sliding engagement with said sealing member and being adapted, in response to actuation of said booster piston, to slide past said seal for said seal to close said port prior to displacement of said auxiliary piston by said rod.

4. A booster arrangement as claimed in claim 3, wherein said piston rod is adapted in its travel after closure of said port and prior to displacement of said auxiliary piston, to displace fluid in said auxiliary cylinder and thereby increase the fluid pressure in said cylinder.

5. A booster arrangement as claimed in claim 1 wherein said piston rod and said auxiliary piston are normally in abutting relation in the inoperative condition of said booster arrangement.

6. A booster arrangement as claimed in claim 5, comprising means defining a first passage through said auxiliary piston, a co-operating part defining with said rod a second passage in series with said first passage, said first and second passages forming part of said fluid supply path, said rod being engageable with said co-operating part to close said second passage in response to a predetermined initial displacement of said rod, whereupon said part is movable with said rod.

7. A booster arrangement as claimed in claim 4, wherein said valve means comprises a valve ball and a co-operating valve seat arranged in said fluid supply path, and including means normally holding said valve ball off said valve seat, the last said means operating in response to a predetermined initial displacement of said rod to permit said valve ball to engage said valve seat and thereby close said path.

8. A booster arrangement for a booster assisted hydraulic system, comprising a pneumatic pressure operated booster motor having a movable wall and an axial rod secured thereto, an auxiliary cylinder mounted adjacent said booster piston, said auxiliary cylinder having at one end thereof a sealed opening through which said axial rod extends, an auxiliary piston within said auxiliary cylinder separate from but in abutting relation with said axial rod, a passage through said piston, a valve member for closing said passage, means normally holding said valve member in an open position in which fluid can flow through said passage, said piston being movable relative to the last said means, and means responsive to a predetermined initial displacement of said rod and piston to cause said valve member to close said passage.

References Cited

UNITED STATES PATENTS

| | | | |
|---|---|---|---|
| 2,654,224 | 10/1953 | Price | 60—54.6 |
| 2,875,583 | 3/1959 | Martin | 60—54.6 |
| 3,032,992 | 5/1962 | Schnell | 60—52 |
| 3,130,551 | 4/1964 | Chouings | 60—54.5 |
| 3,163,007 | 12/1964 | Scott | 60—54.5 |

MARTIN P. SCHWADRON, *Primary Examiner.*

R. R. BUNEVICH, *Assistant Examiner.*

U.S. Cl. X.R.

60—10.5